Dec. 9, 1958  S. W. TRIBIT  2,863,879
OXIDATION OF NAPHTHALENE WITH A VANADIUM
CATALYST OF CONTROLLED VALENCE
Filed Feb. 7, 1956  3 Sheets-Sheet 1

INVENTOR.
SAMUEL W. TRIBIT,
BY
Wm. P. Spielman
ATTORNEY.

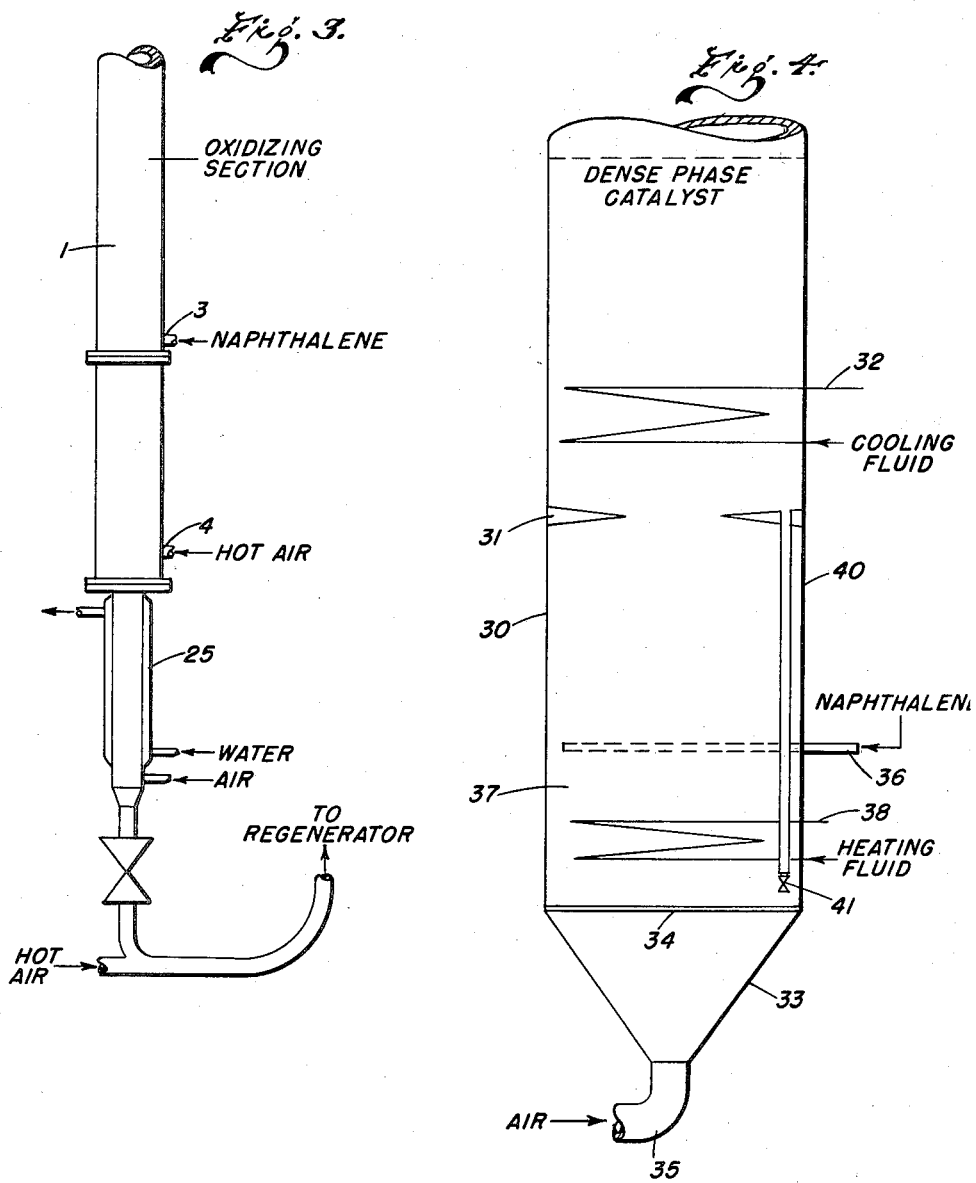

United States Patent Office 2,863,879
Patented Dec. 9, 1958

2,863,879

OXIDATION OF NAPHTHALENE WITH A VANADIUM CATALYST OF CONTROLLED VALENCE

Samuel W. Tribit, Hawthorne, N. Y., assignor to American Cyanamid Company, New York, N. Y., a corporation of Maine Application February 7, 1956, Serial No. 563,922

8 Claims. (Cl. 260—346.4)

This invention relates to a method for the production of phthalic anhydride by the vapor phase catalytic oxidation of naphthalene in a bed of fluidized vanadium catalyst. Its principal object is to obtain increased yields of a phthalic anhydride converter product free from naphthoquinone by maintaining a positive control of the valence state of the vanadium in the catalyst; a further object is to permit greatly increased naphthalene loadings.

The catalytic oxidation of naphthalene and other aromatic hydrocarbons such as ortho-xylene capable of producing phthalic anhydride as the principal oxidation product by the use of a bed of fluidized catalyst particles presents a number of attractive features in comparison with the fixed-bed method that is now almost universally used. Because of the high heat transfer coefficient obtainable with a fluidized mass of solid particles the catalyst temperatures in a fluid bed operation can be maintained within the range of about 320°–420° C. or slightly higher, which is some 100° C. lower than the temperatures ordinarily employed in fixed-bed phthalic anhydride converters. At this lower temperature range contact times of about 3–40 seconds can be used at the linear gas velocities suitable for maintaining proper catalyst fluidization, which with most catalysts are about 0.2–2 feet per second. Pilot plant operations using these conditions have shown, however, that the low temperatures and long catalyst contact times result in over-reduction and deterioration of catalysts in which oxides of vanadium are the principal catalytically active ingredient, so that the naphthalene loadings must be maintained at a relatively low figure to permit continuous operation. This results in a relatively low rate of phthalic anhydride production from a converter of any given size.

The present invention is the result of a study of the effect of the state or degree of oxidation of vanadium oxide-containing catalysts on the yields and quality of phthalic anhydride obtainable in fluidized catalyst bed operations. I have found that when such operations are conducted with catalysts containing a mixture of vanadium tetroxide and vanadium pentoxide there is an optimum $V_2O_4:V_2O_5$ ratio wherein high yields of phthalic anhydride are combined with a high degree of purity as evidenced by a substantially complete absence of naphthoquinone in the product. As will subsequently be shown by experimental data, this ratio lies between the limits of from 70 to 20% by weight of $V_2O_4$ and 30 to 80% of $V_2O_5$ in the catalyst. In its broadest aspects, therefore, my invention consists in carrying out the vapor phase catalytic oxidation of naphthalene with an oxygen-containing gas by means of a fluidized bed of a vanadium oxide catalyst or contact mass wherein this valence state or degree of vanadium oxidation is maintained at all times.

By using relatively high temperatures and a low ratio of naphthalene to oxygen it is possible to maintain equilibrium conditions in a fluid catalyst bed such that the $V_2O_4:V_2O_5$ ratio is within the above range but the converter can only be operated at a low capacity by this method of procedure. I have found, however, that excellent yields of a pure phthalic anhydride product can be obtained simultaneously with greatly increased converter capacities by operating under conditions which would normally result in an equilibrium $V_2O_4$ content in the catalyst in excess of 70% with simultaneous adjustment of the $V_2O_4:V_2O_5$ ratio by continuous partial oxidation of the catalyst. This is preferably accomplished by continuously withdrawing catalyst from the fluidized catalyst bed, partially oxidizing it to a $V_2O_4$ to $V_2O_5$ ratio within the desired limits of from 70:30 to 20:80 and returning it to the catalyst bed.

The important advantages obtained by this procedure are illustrated by the following results which are typical of those obtained without and with partial regeneration of a vanadium oxide catalyst in a fixed fluid catalyst bed. The catalyst used originally contained 10% vanadium pentoxide, 1.5% silver oxide and 45% potassium pyrosulfate on a silica gel carrier; the tests were made in the apparatus shown on Fig. 1 of the attached drawings, and which will be subsequently described. A sample of catalyst was removed from the center of the reaction zone at intervals and analyzed to determine the vanadium content; the results of operation without catalyst regeneration were as follows:

TABLE I

[2.2% inlet naphthalene concentration, temperature 380° C., contact time 4.5 sec.]

| Time, Hrs. | Yield, lbs./100 lbs. | | Percent Reduced Vanadium |
|---|---|---|---|
| | PAA | NQ | |
| 0 | | | 10.2 |
| 1 | | | 68.5 |
| 4.5 | 102 | 1.9 | |
| 7.25 | 100 | 1.5 | 85.0 |
| 13.0 | 102 | 1.9 | |
| 25.0 | 91 | 4.5 | |
| 30.25 | 92 | 6.3 | |
| 30.75 | | | 89 |

The items of interest in this table are the rapid increase of reduced vanadium ($V_2O_4$) in the catalyst, the appearance of increasing amounts of naphthoquinone in the product as the catalyst became progressively reduced, and the gradual decline of phthalic anhydride yields. These are typical of the operation of a system wherein progressive reduction of the catalyst occurs.

In Table II there are shown the results of a run under the same operating conditions wherein a portion of the catalyst was continuously withdrawn and oxidized by contact with a stream of air at 380° C. and then returned to the reactor.

TABLE II

| Total Hours on Naphthalene | Yields, lbs./100 lbs. | | Percent Reduced Vanadium |
|---|---|---|---|
| | PAA | NQ | |
| 0 | | | 10.2 |
| 1 | | | 22.2 |
| 2.25 | 100 | 0.0 | |
| 5.75 | 98.5 | 0.0 | |
| 7.0 | | | 27.7 |
| 72.0 | | | 27.7 |
| 74.0 | 101 | 0.0 | |
| 78.0 | 104 | 0.0 | |
| 96.0 | | | 38.0 |
| 101.0 | 103 | 0.0 | |
| 122.0 | 100 | 0.0 | |
| 125.0 | 102.5 | 0.0 | 38.5 |

It will be noted that excellent yields of a phthalic anhydride converter product completely free from naphthoquinone were obtained by maintaining the catalyst in the proper state of oxidation, even when the process was continued for a long period of time.

Although the principles of the invention are applicable to the vapor phase oxidation of naphthalene with any vanadium oxide-containing catalyst, they are of particular importance when catalysts of this type are used wherein the vanadium oxides are supported on a carrier. The best operating results are obtained when a carrier having a microporous structure is used such as a metal oxide gel catalyst of the type of silica gel, alumina gel, zeolites and the like. It has been found, however, that optimum performance of such gel-supported catalysts is obtained when the contact mass also contains a compound of an alkali metal with an acid of sulfur such as potassium sulfate, potassium pyrosulfate and the like. The corresponding compounds of sodium, lithium or other alkali metals may be substituted for the potassium in whole or in part, but usually with less effective results. Although this feature of the invention is not limited by any theory of operation, my present belief is that the alkali metal compounds function as a flux for the vanadium pentoxide in the catalyst and increase its degree of penetration into the pores of the gel catalyst under operating conditions. This belief is confirmed by the observation that the surface area of a highly oxidized vanadium oxide catalyst containing potassium pyrosulfate and supported on a silica gel carrier is approximately half of its area when the catalyst is in a reduced condition and contains more than 70–75% of its vanadium as $V_2O_4$. Regardless of theoretical considerations, however, the observed fact is that catalysts of this type operate at a much higher degree of efficiency when their $V_2O_4$ content is maintained between the limits of about 20–70%.

The invention will be further described with reference to the accompanying drawings, wherein.

Figure 1:
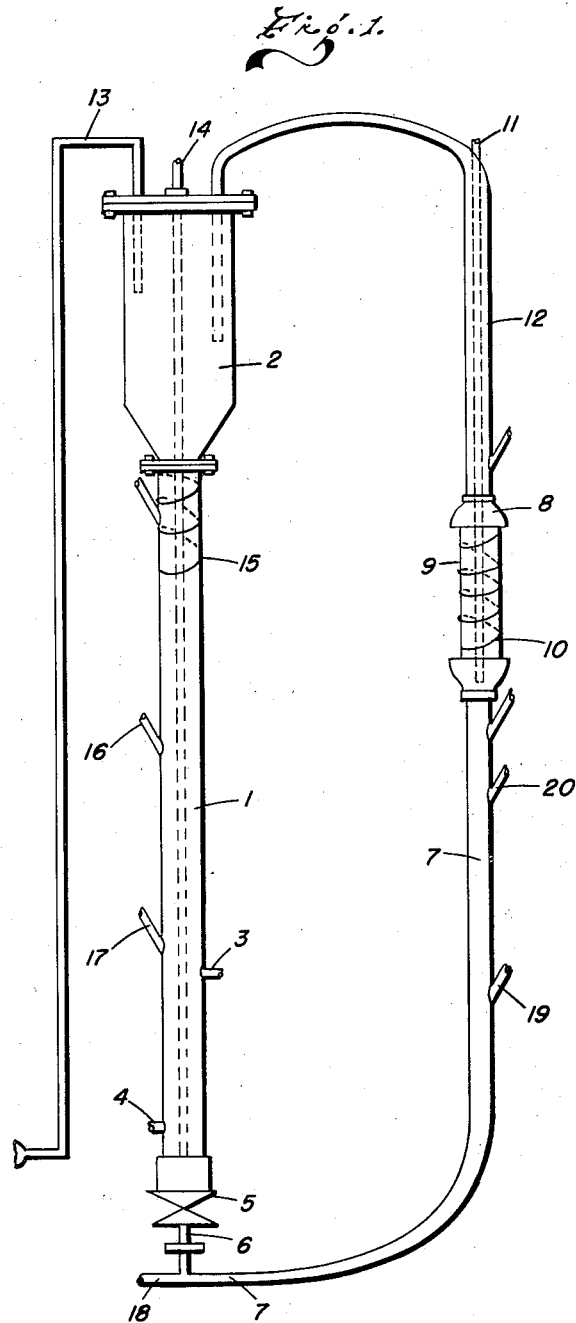
Fig. 1 shows a pilot plant-scale converter equipped with an external catalyst recirculating line and regenerator for maintaining a desired degree of oxidation in the catalyst.

Fig. 3 indicates a modification of the apparatus of Fig. 1 to improve its performance, and Fig. 4 is a diagrammatic illustration of a plant-size converter wherein the principles of the invention are embodied.

Referring to Fig. 1, the reactor designated by reference numeral 1 consisted of a 3/4" x 62" stainless steel tube connected to a 3" x 36" stainless steel catalyst disengaging section 2. An inlet pipe 3 for the introduction of a preheated mixture of naphthalene and air was provided in the reaction tube 1 at the point shown, and the two-foot section between this inlet and an air inlet 4 function as a standpipe to give additional static pressure to the reactor side of the system. Below the standpipe is a motor-driven slide valve 5 to control the rate at which catalyst is withdrawn from the system for reoxidation, and this valve communicates through a short connection 6 with a transport line 7 leading to a regenerator 8. The capacity of this regenerator is small with respect to that of the reactor 1, since the rate and extent of catalyst reoxidation is only that corresponding to its rate of reduction in the reactor; in the apparatus shown it consisted of a 1 1/4" x 11" stainless steel tube 9 wound with a Nichrome spiral heating element 10 and containing a thermocouple well 11. From the top of the regenerator a return line 12 connects with the disengaging section 2 so that the catalyst after partial oxidation can be returned continuously to the reactor. The disengaging setion contains a fiber glass bag filter (not shown) which surrounds an outlet line 13 leading to a condenser for the phthalic anhydride product. The reactor 1 is equipped with a suitable thermocouple well 14 and with a winding of Nichrome spiral wire 15 for maintaining the desired temperatures in the reactor. It will be understood that in commercial sized units cooling elements would be used in the reactor to remove the heat given off by the naphthalene oxidation, but in pilot plant equipment it is usually necessary to supply heat to maintain the desired temperature in the catalyst bed.

In operation a finely divided catalyst of the type and particle size described in U. S. Patent No. 2,698,330 was filled into the reactor through valved inlet pipes 16 and 17 and metered air, preheated to the desired temperature, was passed into the transport line 4. A mixture of air and naphthalene vapor was introduced into this catalyst through line 3 and the gaseous reaction products were withdrawn through line 13. The air transported catalyst which dropped through the valve 5 was picked up by a stream of preheated air introduced through line 18 and carried through line 7 into the regeneration section where, because of its increased cross-sectional area, the linear velocity was decreased and a dense-phase fluid bed was formed. The catalyst left the regenerator through line 12 and passed into the disengaging section 2 from which it dropped into the reactor section while the air passed through the bag filter and left the apparatus through line 13.

The vertical section of the transport line 7 contained two 1/8" manometer taps 19 and 20 which were 31 1/4" apart. A differential manometer, with platinum electrodes in each leg, was placed across these taps. Two electronic relays were connected by the manometer taps and the motor-driven slide valve 5 so that an increase or decrease in the pressure across the taps caused the valve to be opened or closed, thus increasing or decreasing the catalyst circulation rate. Pressure taps in the reactor and regenerator sections permitted determination of catalyst bed height and catalyst density.

In later experiments an apparatus similar to that of Fig. 1, but of larger size, was used. Fig. 3 of the drawings shows a modification that was incorporated into this apparatus; a water-cooled jacket 25 was placed around the lower end of the catalyst transport line to cool the catalyst before it reached the slide valve 5. This materially improved the operation of the apparatus.

Representative results of operations in this equipment are described in detail in the following examples. They demonstrate clearly the fact that improved phthalic anhydride yields and freedom from naphthoquinone are obtainable both at the ratios of naphthalene to air that have heretofore been considered feasible (from about 0.5 to 1.25 mole percent of naphthalene in air) and at greatly increased naphthalene loadings up to 3.3 mole percent. Further discussion of these advantages of the invention is therefore unnecessary.

A convenient method of applying the principles of the invention to a converter of full plant scale is shown on Fig. 4 of the drawings. A converter of this size, indicated generally by reference numeral 30, may be some 10–15 feet in diameter and 60–80 feet in height. The converter is divided by one or more baffles 31 into zones wherein the desired operating temperatures are maintained in the catalyst by means of heat exchangers such as the coil 32 shown diagrammatically on the drawing. The converter preferably has a conical bottom section 33 which is separated from the catalyst-containing portion by a perforated gas distributing plate 34. In the ordinary operation of such a converter sufficient air to fluidize the catalyst would be introduced through air inlet 35 and the inlet pipes for the naphthalene-air mixture would be located at the bottom of the catalyst bed.

In order to provide a catalyst reoxidation section the naphthalene inlet pipe is simply raised some 8–10 feet to the location shown at 36 on the drawing and the quantity of air supplied through pipe 35 is increased if necessary to provide the requisite flow of oxyen for regeneration of the catalyst. In order to maintain a fluidized regeneration bed, indicated on the drawing by reference numeral 37, at its proper temperature of about 320°–

400° C. a heating element 38 is preferably provided as shown. Catalyst is continuously withdrawn from the reaction zone above the naphthalene inlet 36 by means of one or more downcomer pipes 40, which may be provided with pressure-controlled valves 41 similar to those in the pilot plant apparatus previously described. The catalyst so withdrawn is reoxidized by the stream of air entering through pipe 35 and is then carried upwardly by this air stream into the reaction zone for reuse in oxidizing further quantities of naphthalene.

While other methods of reoxidizing the withdrawn catalyst may be used, the best results are obtained by converting it into a separate fluidized bed and passing an oxidizing gas such as air upwardly therethrough. By this procedure the catalyst can readily be maintained at temperatures within the range of about 320°–400° C., which I have found to be the proper temperatures for reoxidation. Below 320° C. the regeneration rate is too slow for efficient operation, whereas regeneration above 400° C. will cause deterioration of the catalyst.

An additional important advantage of the invention resides in the use of oxidizing gases having an oxygen content differing from that found in air. The use of an oxidizing gas containing less than 21% of oxygen, and preferably within the range of about 10% to 18%, has previously been proposed for the vapor phase catalytic oxidation of naphthalene in a fluidized catalyst bed converter. Experiments have shown that exceptionally high yields of phthalic anhydride can be obtained for a short time with gases having this reduced oxygen content, presumably because decomposition of the phthalic anhydride by oxidation in the catalyst-disengaging portion of the converter is cut down by the lower oxygen content in the exit gases. Unfortunately, however, this type of operation cannot be continued for any extended length of time as the reduced oxygen content of the gases causes a rapid reduction of the vanadium oxide catalyst. By maintaining a continuous external reoxidation of the catalyst using an oxidizing gas separate from that introduced into the reactor, and preferably having a higher oxygen content, this difficulty is overcome and operations with the above-described oxidizing gas of low oxygen content are entirely feasible.

Another important advantage of this invention resides in the fact that the regenerator can be operated under conditions entirely different from those used in the reactor if desired. Thus the catalyst regenerator can be maintained at a lower or a higher operating temperature than that used in the reactor; it may be and preferably is of much smaller size than the reactor, and the oxidizing gas may contain a higher or a lower percentage of oxygen than that used in the reactor. It will be seen, therefore, that a separate and independent control of the valence state of the catalyst by applying the principles of external regeneration results in a remarkable improvement in the flexibility and control of the fluid bed vapor phase catalytic oxidation of naphthalene.

Although the invention has been described with particular reference to the use of naphthalene as the hydrocarbon reagent for phthalic anhydride production, it will be understood that its principles are not limited thereto. There are a number of other aromatic hydrocarbons, such as ortho-xylene for example, which are known to produce phthalic anhydride in good yields upon vapor phase catalytic oxidation, and which can therefore be used in place of or in admixture with naphthalene. It will be understood that any of these can be substituted for naphthalene without departing from the scope of the invention.

The invention will be further described and illustrated by the following specific examples.

Example 1

Comparative tests were made in the equipment of Fig. 1 of the drawings using a silver-vanadium catalyst prepared as described in Example 2 of U. S. Patent No. 2,698,330 containing 46% $SiO_2$, 43% $K_2S_2O_7$, 10% $V_2O_5$ and 1% $Ag_2O$. The catalyst was oxidized at 400° C. for seven days and then used in the regenerative experiment; it was then reoxidized and used in the non-regenerative test.

The following conditions were maintained in the apparatus during its operation with continuous regeneration.

| | Reactor | Transport Line | Regenerator |
|---|---|---|---|
| Temperature, ° C | 390 | 400 | 400 |
| Linear Velocity, ft./sec | 1.1 | 9.0 | 1.0 |
| Contact Time, seconds | 4.4 | | 1.7 |
| Inlet Concentration of Naphthalene, mole percent | 1.1 | | |
| Catalyst Weight, grams | 275 | | 140 |
| Catalyst Circulation Rate, lbs./hr | 4 | 4 | 4 |
| Catalyst Fluidized Density, lbs./cu. ft | 20–30 | ca. 1.0 | 20–30 |
| Catalyst Changes per hour | 6–8 | | 12–14 |

Figure 2:
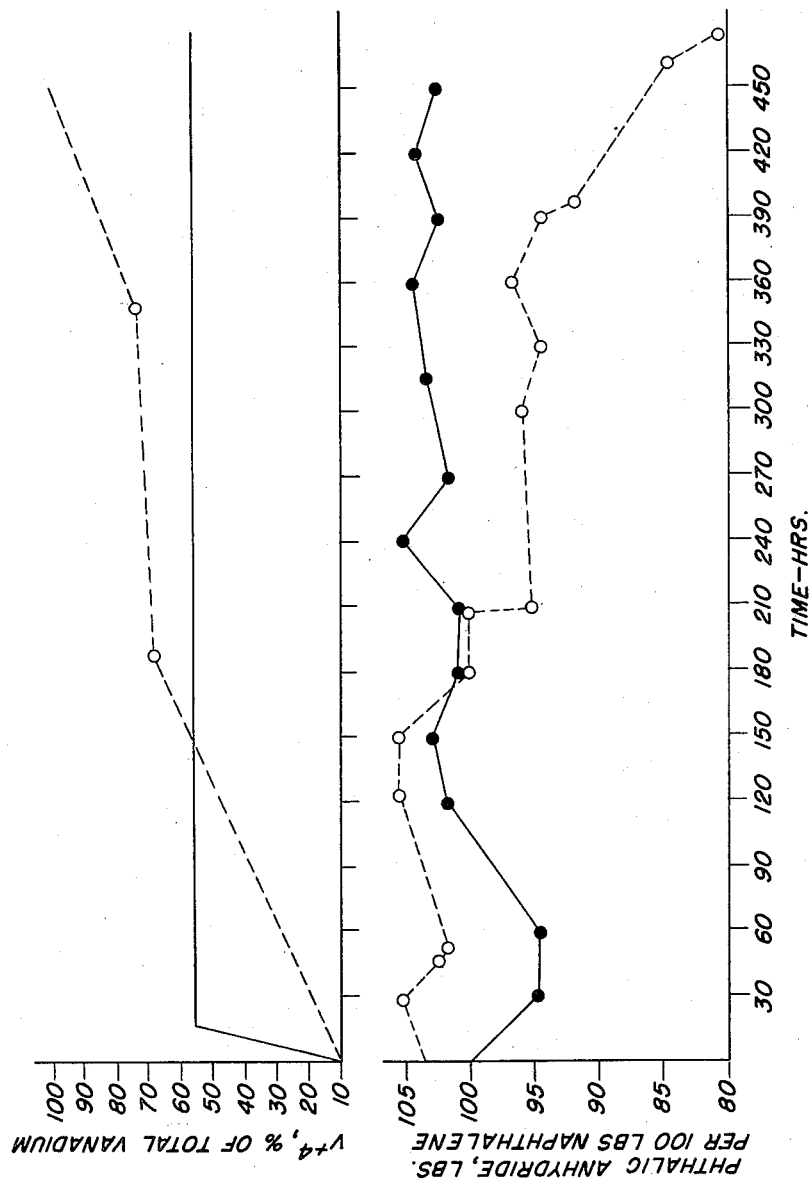
Fig. 2 is a graph showing the results of tests made in the apparatus of Fig. 1.

The results obtained during this run are shown by the solid line on Fig. 2 of the drawings. The relatively low phthalic anhydride yields of 92–95% in the early stages of operation are merely the result of a search for optimum operating conditions; these were established after about 60 hours of operation. The yields then stabilized at 100 pounds of phthalic anhydride or better throughout the entire run. No difficulty was experienced in maintaining the catalyst at the selected 45% $V_2O_5$–55% $V_2O_4$ level.

The results of the non-regenerative test are shown by the broken lines on Fig. 2 of the drawings. This run was made in the same apparatus with valve 5 closed and no air in the regenerator. The conditions in the reactor were:

Temperature, ° C _____ 380
Naphthalene conc., mole percent _____ 1.1
Linear velocity, ft./sec _____ 1.1
Bed height, inches _____ 58
Contact time, seconds _____ 4.4

It will be noted that the catalyst produced phthalic anhydride from naphthalene in yields of 100 pounds or better for about eight days. During this time the rate of catalyst reduction was 0.0143% $V^{+4}$ per hour; this is not significantly different from other vanadium catalysts that have been tested under the same conditions. During the next eight days the yield of phthalic anhydride remained at about 95 pounds; the catalyst then deteriorated rapidly with a resulting drop in yield to as low as 81 pounds. Naphthoquinone was first noted in the product after 350 hours of operation and was produced in increasing quantities as the yield of phthalic anhydride dropped. The rate of catalyst reduction over the first 350 hours of operation was 0.09% $V^{+4}$ per hour.

Example 2

In order to show that positive control of the $V^{+4}$ to $V^{+5}$ ratio in the catalyst will permit operation at high naphthalene loadings a series of comparative tests was made. The equipment was similar to that shown in Fig. 1 of the drawings but of larger size; the reaction tube containing the fluidized catalyst was 2 inches in diameter and 20 feet tall and the size of the regenerator was 2 inches by 5 feet.

The first test was a run with the valve 5 closed and the regenerator not used in order to find the optimum reaction temperature at 1.7 mole percent naphthalene inlet concentration. Then the inlet concentration was changed while frequent checks were made on the reduced vanadium in the catalyst and the phthalic anhydride yields. The catalyst contained 5% of vanadium and was similar in composition to that of Example 1. The operating conditions were:

Catalyst charge, grams _____ 5700
Naphthalene feed rate, grams per hour _____ 96
Total air to reactor, liters per hour _____ 850
Linear gas velocity in reactor, ft./sec _____ 0.63
Average pressure, p. s. i. a _____ 18
Catalyst bed height, feet _____ 14
Contact time, seconds _____ 22

The test results are shown in the following table wherein "Catalyst Reduction, percent" expresses the ratio of tetravalent vanadium to total vanadium in the catalyst.

TABLE I

| Time, Hrs. | Temp., °C. | Naphthalene Inlet Concentration, Mole Percent | PAA Yield, lbs./100 lbs. Naphthalene | Catalyst Reduction, Percent |
|---|---|---|---|---|
| 0 | 335 | 1.7 | 0 | 12 |
| 1 | 355 | 1.7 | | 28 |
| 12 | 355 | 1.7 | 92 | 40 |
| 15 | 345 | 1.7 | 101 | 48 |
| 18.5 | 345 | 1.7 | | 54 |
| 22 | 345 | 2.1 | | 66 |
| 24 | 345 | 2.1 | | 70 |
| 28 | 345 | 2.1 | 95 | 78 |
| 32 | 345 | 1.9 | | 70 |
| 36 | 345 | 1.9 | | 74 |
| 40 | 345 | 1.9 | | 68 |
| 43 | 345 | 1.9 | 100 | 68 |

At 1.7 mole percent naphthalene inlet concentration the $V^{+4}$ in the catalyst reached 54%; at this point the concentration of naphthalene was increased to 2.1%. This increased the $V^{+4}$ to 78% in only six hours and the percentage was increasing at the rate of 2% per hour. The yield of phthalic anhydride was correspondingly reduced and when it reached 95 lbs. there were 2.7 lbs. of naphthoquinone in the product. When the inlet concentration of naphthalene was lowered to 1.9% the $V^{+4}$ decreased to 68 and the phthalic anhydride yield increased to 100 lbs.

A run was then made with a naphthalene inlet concentration of 2.1% wherein the $V^{+4}$ level of the catalyst was maintained at 50–60% by continuous regeneration using the following conditions:

Reactor temperature _____ °C __ 345
Regenerator temperature _____ °C __ 345
Catalyst circulation rate _____ lbs./hr __ 90
Contact time _____ seconds __ 17
Linear gas velocity through the catalyst __ ft./sec __ 0.8

TABLE II

| Time, Hrs. | PAA Yield, lbs./100 lbs. Naphthalene | Catalyst Reduction, Percent |
|---|---|---|
| 0 | | 16 |
| 1 | | 64 |
| 6 | | 64 |
| 14.5 | 100 | 50 |
| 18 | 100 | 58 |
| 22 | | 58 |
| 26 | 105 | 52 |
| 29.5 | | 52 |
| 38 | | 56 |
| 42 | 102 | 56 |
| 46 | | 50 |
| 60 | 103 | 56 |

The higher $V^{+4}$ percentage during the first few hours of the runs was due to erratic circulation of the catalyst. It will be noted that good yields of phthalic anhydride were obtained during the entire run; the product contained no naphthaquinone and was of good quality.

A third run was made with the same catalyst at a still higher loading, using a naphthalene concentration of 3.2% (197 grams of naphthalene per hour), a linear gas velocity through the catalyst of 0.8 foot per second and a catalyst bed height of 14–15 feet with the following results:

TABLE III

| Time, Hrs. | Temperature, °C. | | Yield, lbs./100 lbs. Naphthalene | | Catalyst Reduction, Percent |
|---|---|---|---|---|---|
| | Reactor | Regenerator | PAA | NQ | |
| 0 | 370 | 370 | | | 12 |
| 2 | 370 | 370 | 93 | 2.2 | 44 |
| 5 | 380 | 380 | 98 | 0.7 | 44 |
| 7.5 | 380 | 380 | | | 38 |
| 19.5 | 380 | 380 | | | 36 |
| 20.5 | 380 | 380 | 100 | 0 | |
| 24.5 | 380 | 380 | | | 34 |
| 25.5 | 380 | 380 | 97.5 | 0 | |
| 29 | 380 | 380 | 100 | 0 | 38 |

Phthalic anhydride free from naphthoquinone and of good quality was obtained in good yields by maintaining the percentage of reduced vanadium in the catalyst at about 34–45% even with the high naphthalene concentrations used. This example therefore shows that the principles of the invention can be used to increase materially the production capacity of a phthalic anhydride converter by increasing the naphthalene loading while maintaining the reduced vanadium in the catalyst within the range of about 35–70%.

*Example 3*

The equipment and catalyst of Example 2 were used in another run with the following operating conditions:

Inlet naphthalene conc _____ mole percent __ 2.6
Bed height _____ ft __ 14–15
Circulation rate _____ lbs./hr __ 90
Linear gas velocity through catalyst _____ ft./sec __ 1.25

| Time, Hrs. | Temperature, °C. | | Yield, lbs./100 lbs. Naphthalene | | Catalyst Reduction, Percent |
|---|---|---|---|---|---|
| | Reactor | Regenerator | PAA | NQ | |
| 0 | 380 | 370 | | | 12 |
| 2.5 | | 370 | 94 | None | |
| 4 | | | 97.5 | | 20 |
| 24 | | | 97.5 | | 22 |
| 27 | | | 100 | | |
| 96 | | | 96.5 | | 26 |
| 120 | 400 | | 97 | | 22 |
| 175 | 400 | | 97 | | 20 |

These results show that increased production can also be obtained with commercially acceptable yields of a phthalic anhydride free from naphthoquinone by means of increased gas velocities when the reduced vanadium content of the catalyst is maintained at a low figure.

Before the run was concluded the regenerator was shut off to see whether the high operating temperature (400° C.) and high free oxygen content in the reacted gases (7%) would prevent catalyst reduction. In 2¼ hours of operation without regeneration the $V^{+4}$ content of the catalyst increased from 20% to 25% which indicated that regeneration is necessary under these operating conditions.

*Example 4*

A number of runs were made in which the ratio of $V^{+4}$ to total vanadium in the catalyst was maintained in equilibrium by continuous external regeneration at the values shown in the following table and the conversion products were analyzed. The contact time of naphthalene with the catalyst was 15-16 seconds; catalyst bed height, 14-15 ft.; circulation rate of catalyst through the regenerator, 20 to 120 lbs. per hour; and reactor to regenerator catalyst ratio, 3 to 1. Regeneration temperatures were from 175° to 400 °C. The runs were as follows:

TABLE I

| Reactor Temp. 330° C. | | | | Reactor Temp. 350° C. | | | | |
|---|---|---|---|---|---|---|---|---|
| Inlet Naphthalene Conc. 2.02% | | | | Inlet Naphthalene Conc. 3.3% | | | | |
| Percent Reduced Vanadium | Percent Conversion to— | | | Total | Percent Reduced Vanadium | Percent Conversion to— | | | Total |
| | PAA | NQ | $CO_2$ | | | PAA | NQ | $CO_2$ | |
| 83 | 84.1 | 6.9 | 5.9 | 97 | 90 | 62 | 13 | 11 | 86 |
| 75 | 92.5 | 1.9 | 6.6 | 100.5 | 86 | 73 | 11 | 9 | 93 |
| 68 | 94.3 | 0 | 6.6 | 100.9 | 72 | 91 | 1 | 8 | 100 |
| 70 | 92.5 | 0 | 6.2 | 98.5 | 55 | 90 | 0 | 7 | 100 |
| 37 | 91.2 | 0 | 7.8 | 99 | 54 | 90 | 0 | 10 | 100 |
| 32 | 92.8 | 0 | 10.4 | 103 | 52 | 95 | 0 | 10 | 102 |

These results were plotted; the following is the interpolated data:

TABLE II

| Percent Reduced Vanadium | 2.02% Nap. Inlet Conc. Yield, lbs./ 100 lbs. Naphthalene | | 3.3% Nap. Inlet Conc. Yield, lbs./ 100 lbs. Naphthalene | |
|---|---|---|---|---|
| | PAA | NQ | PAA | NQ |
| 30 | 107 | 0 | | |
| 40 | 107 | 0 | | |
| 50 | 107 | 0 | 104 | 0 |
| 70 | 107 | 0 | 104 | 0 |
| Critical State | | | | |
| 75 | 107 | 2.3 | 103 | 3.5 |
| 80 | 101 | 5 | 97.5 | 8.0 |
| 85 | 94 | 8 | 87.5 | 14.0 |

This tabulation demonstrates the effect of the ratio of $V_2O_4$ to $V_2O_5$ in the catalyst on its performance. When this ratio exceeds 70% the yields of phthalic anhydride fall off rapidly and the product is contaminated with naphthoquinone. Maintenance of a lower ratio by continuous external regeneration of the catalyst, however, results in increased yields of a pure phthalic anhydride product even when the naphthalene loadings are much greater than those ordinarily used.

What I claim is:

1. A method of producing phthalic anhydride which comprises passing a mixture of naphthalene vapor and an oxygen-containing gas at linear velocities of about 0.2–2 feet per second through a bed of fluidized catalyst particles containing as the principal active catalyst a mixture of $V_2O_4$ and $V_2O_5$ at a temperature within the range of about 320°–420° C. and a naphthalene-to-oxygen ratio such that upon continued operation the ratio of $V_2O_4$ to $V_2O_5$ in the catalyst would exceed 70:30 and maintaining said ratio between the limits of 70:30 and 20:80 by continuously withdrawing catalyst from said bed, continuously partially oxidizing it to a $V_2O_4$ to $V_2O_5$ ratio within said limits and returning it to said catalyst bed.

2. A method of producing phthalic anhydride which comprises passing a mixture of naphthalene vapor and an oxygen-containing gas at linear velocities of about 0.2–2 feet per second through a bed of fluidized catalyst particles containing as the principal active catalyst a mixture of $V_2O_4$ and $V_2O_5$ at a temperature within the range of about 320°–420° C. and a naphthalene-to-oxygen ratio such that upon continued operation the ratio of $V_2O_4$ to $V_2O_5$ in the catalyst would exceed 70:30 and maintaining said ratio between the limits of 70:30 and 20:80 by continuously withdrawing catalyst from said bed, forming therefrom a second fluidized bed having a temperature within the range of about 320°–400° C. and continuously partially oxidizing it by passing a stream of an oxygen-containing gas upwardly therethrough, and returning reoxidized catalyst therefrom to the first-named catalyst bed.

3. A method of producing phthalic anhydride which comprises passing a mixture of naphthalene vapor and air at linear velocities of about 0.2–2 feet per second through a bed of fluidized catalyst particles containing as the principal active catalyst a mixture of $V_2O_4$ and $V_2O_5$ at temperatures within the range of about 320°–420° C. and a naphthalene to air ratio of from 1.25 to 3.3 mole percent and maintaining the ratio of $V_2O_4$ to $V_2O_5$ in the catalyst between the limits of 70:30 and 20:80 by continuously withdrawing catalyst from said bed, continuously partially oxidizing it to a $V_2O_4$ to $V_2O_5$ ratio within said limits and returning it to said catalyst bed.

4. A method of producing phthalic anhydride which comprises passing a mixture of naphthalene vapor and an oxygen-containing gas at linear velocities of about 0.2–2 feet per second through a bed of fluidized particles of a catalyst comprising a mixture of $V_2O_4$, $V_2O_5$ and a potassium sulfate supported on a silica gel carrier at temperatures within the range of about 320°–420° C. and a naphthalene-to-oxygen ratio such that upon continued operation the equilibrium ratio of $V_2O_4$ to $V_2O_5$ in the catalyst would exceed 70:30 and maintaining said equilibrium ratio between the limits of 70:30 and 20:80 by continuously withdrawing catalyst from said bed, continuously partially oxidizing it to a $V_2O_4$:$V_2O_5$ ratio within said limits and returning it to said catalyst bed.

5. A method of producing phthalic anhydride which comprises passing a mixture of naphthalene vapor and a gas mixture containing about 10–18% of oxygen at linear velocities of about 0.2–2 feet per second through a bed of fluidized catalyst particles containing as the principal active catalyst a mixture of $V_2O_4$ and $V_2O_5$ at temperatures within the range of about 320°–420° C. and maintaining the ratio of $V_2O_4$ to $V_2O_5$ in the catalyst between the limits of 70:30 and 20:80 by continuously withdrawing catalyst from said bed, continuously partially oxidizing it to a $V_2O_4$ to $V_2O_5$ ratio within said limits and returning it to said catalyst bed.

6. A method of producing phthalic anhydride which comprises passing a reagent mixture of naphthalene vapor and air containing from 1.1 to 3.3 mole percent of naphthalene at linear velocities of about 0.2–2 feet per second and a temperature within the range of about 320°–420° C. through a bed of fluidized catalyst particles containing as the principal active catalyst a mixture of $V_2O_4$ and $V_2O_5$ while continuously maintaining the $V_2O_4:V_2O_5$ ratio therein between the limits of 70:30 and 20:80.

7. A method of producing phthalic anhydride which comprises passing a reagent mixture of naphthalene vapor and air containing from 1.1 to 3.3 mole percent of naphthalene at linear velocities of about 0.2–2 feet per second and a temperature within the range of about 320°–420° C. through a bed of fluidized catalyst particles containing as the principal active catalyst a mixture of $V_2O_4$ and $V_2O_5$ while maintaining the $V_2O_4:V_2O_5$ ratio therein between the limits of 70:30 and 20:80 by continuously withdrawing a portion of the catalyst from contact with said reagent mixture and continuously partially oxidizing it to a $V_2O_4$ to $V_2O_5$ ratio within said limits and returning it to contact therewith.

8. A method of producing phthalic anhydride which comprises passing a reagent mixture of naphthalene vapor and air at linear velocities of about 0.2–2 feet per second and a temperature within the range of about 320°–420° C. through a bed of fluidized catalyst particles containing as the principal active catalyst a mixture of $V_2O_4$ and $V_2O_5$, said reagent mixture having a naphthalene-to-air ratio within the range of 1.1 to 3.3 mole percent of naphthalene and such that upon continued operation the ratio of $V_2O_4$ to $V_2O_5$ in the catalyst would exceed 70:30, and maintaining said ratio between the limits of 70:30 and 20:80 by continuously withdrawing a portion of the catalyst from contact with said reagent mixture and continuously partially oxidizing it to a $V_2O_4:V_2O_5$ ratio within said limits and returning it to contact therewith.

References Cited in the file of this patent

UNITED STATES PATENTS

| | | |
|---|---|---|
| 1,692,126 | Jaeger | Nov. 20, 1928 |
| 2,373,008 | Becker | Apr. 3, 1945 |
| 2,425,398 | Ruthruff | Aug. 12, 1947 |
| 2,489,346 | Welty | Nov. 29, 1949 |
| 2,526,689 | Rollman | Oct. 24, 1950 |
| 2,604,479 | Rollman | July 22, 1952 |
| 2,698,330 | Fugate | Dec. 28, 1954 |
| 2,765,323 | Dixon | Oct. 2, 1956 |

OTHER REFERENCES

Marek: Cat. Oxidation of Organic Compounds, pages 406–420 (1932), A. C. S. Monograph. (Copy in Scientific Library.)